July 28, 1942.  C. E. SWENSON  2,291,420
PROPELLER SHAFT MANUFACTURE
Filed Aug. 7, 1939
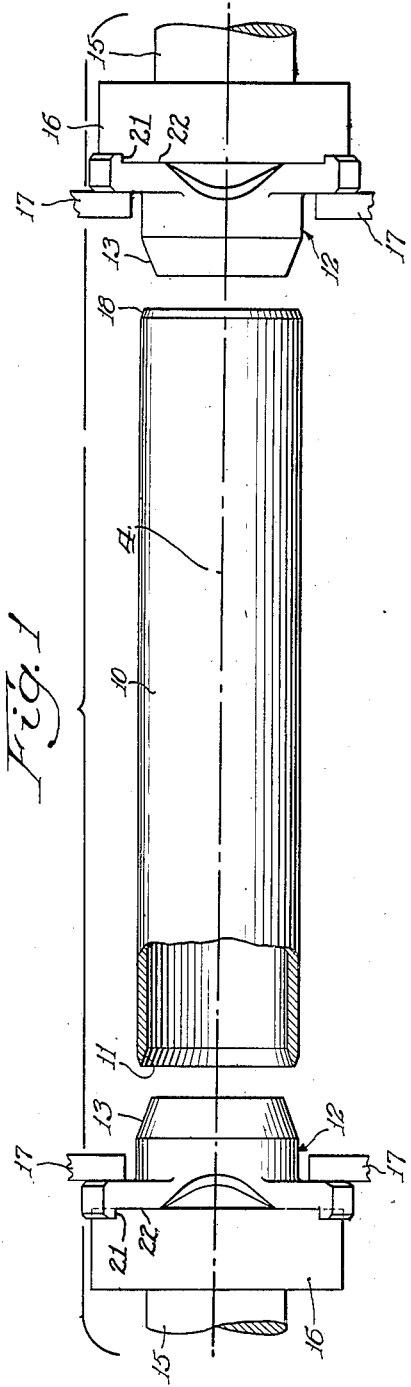
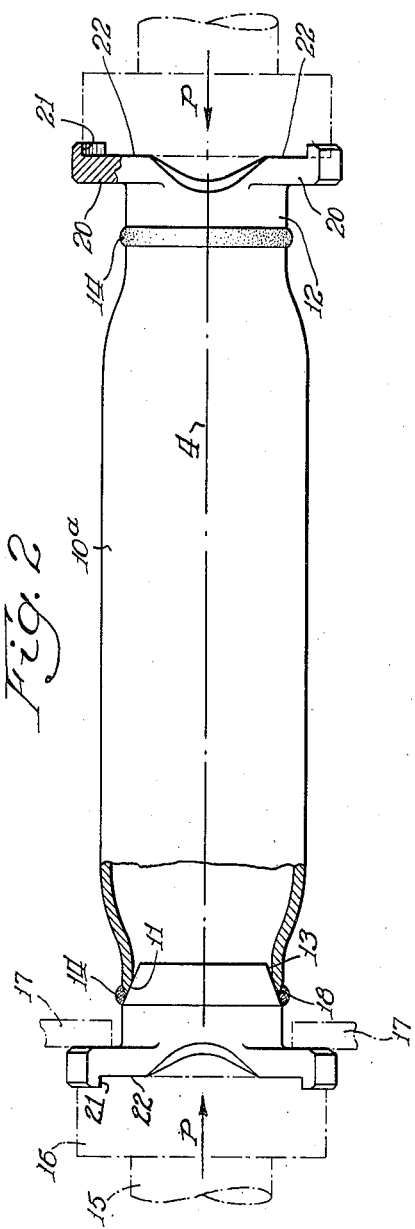
Inventor:
Carl E. Swenson
By: Edward C. Gritzbaugh
Atty.

Patented July 28, 1942

2,291,420

UNITED STATES PATENT OFFICE 2,291,420

PROPELLER SHAFT MANUFACTURE

Carl E. Swenson, Rockford, Ill., assignor to Borg-Warner Corporation, Chicago, Ill., a corporation of Illinois Application August 7, 1939, Serial No. 288,723

7 Claims. (Cl. 29—152)

This invention relates to a method of manufacturing propeller shaft and universal joint yoke assemblies having particular reference to a solution of the problem of obtaining static and dynamic balance of the resulting assemblies.

It is an object to provide a new and novel method of mounting a joint connector member on the end of a tubular member and welding the two or three members as the case may be, together in a manner to improve accuracy and thus produce substantially complete static and dynamic balance.

It is a more particular object to provide a novel method of welding the yoke member of a universal joint to its associated propeller shaft whereby to obtain substantially complete static and dynamic balance with a minimum of balancing following the welding operation.

A still more detailed object is the provision of a method of fabricating propeller shaft and yoke assemblies providing for the simultaneous attachment to the propeller shaft of the yoke members on each end thereof by welding in a manner such as to effect a substantially complete static and dynamic balance without the necessity of extensive subsequent balancing operations.

Other and more detailed objects and advantages of my invention will become apparent from a reading of the following specification taken in connection with the appended drawing which forms a part thereof and wherein:

Fig. 1 is a schematic partially exploded view showing the tubular propeller shaft with the yoke members positioned adjacent the ends thereof and mounted on the supporting spindles ready for axial movement of the yoke members into engagement with the tubular member;

Fig. 2 is an assembled view showing the propeller shaft and yoke assembly structure resulting from the practice of my new method, a reduced end type of tube being illustrated.

Referring to the figures of the drawing, my new method comprises essentially the steps of forming a hollow tubular member 10 with an inwardly extending conical surface 11 at each end thereof, and similarly forming yoke members 12 with conical surface portions 13 following which these conical surfaces are moved into engagement under a firm axial pressure to effect concentricity and accuracy resulting in improved dynamic and static balance, and the whole assembly rotated about a common axis the respective yoke members being arc-welded to the tubular member during such rotation as indicated at 14.

The conical surfaces 11 and 13 together with the pressure applied to the assembly, is effective as is readily apparent to bring about the centering or even distribution of mass about the common axis. The subsequent rotation is effective to both facilitate the welding operation and to further improve the centering or distribution of mass about the common axis.

In carrying out my new method, I prefer to employ a machine (only a part of which is shown) including spindles 15 at least one of which is movable axially with respect to the other for the purpose of applying the necessary axial pressure. While the spindles 15 are moving into the ends of the tube, the latter may be supported in any convenient manner, as by the hands of the operator or in suitable supports which will allow the tube to be lifted clear of such supports during the centering operation. The spindles 15 are formed with heads 16 and additionally supplied with clamping finger assemblies 17, which may be of any well known construction, the details of which finger assemblies are not considered necessary to a disclosure of the present invention and hence are omitted.

Prior to the assembling operation, I prefer to machine yoke member 12 to form the various surfaces required thereon for its eventual cooperation as part of a universal joint assembly, including surface 22 perpendicular to axis $x$ on which axis the yoke members are positioned, and arcuate positioning surfaces 21, the center of each of which arcuate surfaces lies on axis $x$. Only one of the arcuate surfaces 21 is shown to advantage in Fig. 2, however there are two of these surfaces on each yoke. The nature of these surfaces as well as the manner of their machining, is well known being fully disclosed in my prior Patents 1,985,531 and 1,985,669. I prefer to form the conical surfaces 13 on the yoke members 12 while the yokes are supported in the machine above described and prior to the welding operation. However, it is to be understood that surface 13 may be machined on yoke members 12 in a separate machine, or may be formed by a die stamping operation.

Tubular member 10 is additionally formed with conical portions 18 on the end thereof converging with interior conical portions 11. Conical portion 18 forms with the joining portion of surface portion 13 a convenient annular depression for the reception of the metal 14 deposited therein by arc-welding. I have found that the conical surfaces function to better advantage where the angle is less than 80° but greater than 10°, and to best advantage where the angle is less than 45° and more than 30°. While I contemplate using this size of angle, I nevertheless also contemplate other angles or forms coming within the scope of my invention.

I prefer to form conical portions 11 and 13 on the ends of tubular member 10 by placing the said tubular member in a machine (not shown) provided with means including the usual necessary centering chuck for holding and turning said tubular member about the axis thereof while advancing a suitable cutting tool axially into cutting engagement with the end of the tube while turning the same. In this way, the conical surfaces are made concentric with the axis of the tube 10. This is particularly important in swaged tubes or tubes which are reduced in diameter adjacent the ends thereof, as the tube 10a of Fig. 2, since otherwise it is very difficult to keep a reduced diameter of the tube concentric with the larger diameter thereof by forming the conical surfaces on the ends of a swaged tube. In the manner above described, the conical surfaces are formed concentric to the large diameter of the tube.

In the prevailing practice of welding a yoke member to a propeller shaft, the tubular shaft is first pressed onto the cylindrical hub of the yoke, and the pressure is relaxed during the welding operation. Under such conditions, the localized heat from the welding arc may tend to pull apart the portion of the joint or seam not already welded. As a result, the parts will, as they continue to revolve under the arc, be united in inaccurate or eccentric relationship to each other. The present invention remedies this condition by providing for automatic self-centering and aligning of the parts as they are being united. More specifically, it is believed to clearly follow from the above that by maintaining the axes of both yoke members 12 precisely on the same axis $x$, and bringing these yoke members closer together while allowing conical positioning surfaces 13 thereon to engage complementary propeller shaft positioning surfaces 11, the result is a perfectly balanced assembly. All surfaces 22 are maintained absolutely parallel, and the centers of all arcuate surfaces 21 are maintained on the same axis $x$ while bringing the two pairs of conical positioning surfaces into engagement, thus resulting in propeller shaft 10 finding or assuming a position wherein the axis thereof coincides with axis $x$. There follows a proper distribution of all mass about axis $x$, and hence a substantially perfect static and dynamic balance.

While I have disclosed my invention in connection with certain specific embodiments thereof, I wish these to be by way of illustration and desire that my invention be defined by the appended claims which should be construed as broadly as the prior art will permit.

I claim:

1. The method of permanently securing in unit assembly a torque transmitting shaft and a pair of terminally disposed universal joint yokes whereby the predesigned axes of rotation of said yokes are maintained in absolute alignment and said intermediately located shaft is disposed concentric to said aligned axes for dynamic and static balance of the entire unit assembly, which method comprises, locating upon a common axis a pair of spaced apart supporting heads, forming said heads with surfaces to coact with preformed work surfaces on said yokes in such a manner as to locate the said predesigned axes of said yokes on said common axis, forming the inwardly directed and opposed end portions of said yokes with conical positioning surface portions concentrically located about said predesigned axes respectively, forming on each end of said torque transmitting shaft conical positioning surfaces complementary to said conical surfaces on said yoke portions, which are located concentric with the axis of said shaft, urging at least one of said supporting heads relatively toward the other under pressure, while maintaining the same on said common axis with said shaft located between said yokes, the engagement of said conical surfaces being effective to produce alignment of said shaft with said aligned yoke members, and welding said torque transmitting shaft to said yoke portions while the parts are thus assembled.

2. The method of mounting universal joint yoke members on both ends of a tubular shaft, the yoke members each including a plane face portion perpendicular to the axis of said member, and a pair of radially inwardly facing arcuate locating shoulders having a common center on said axis, forming each of said yoke members with a conical aligning surface, forming each end of said tubular shaft with a complementary conical aligning surface, mounting said yoke members on a pair of opposed coaxially aligned cylindrical spindle heads with said arcuate surfaces closely embracing the associated head and said plane faces engaging the associated end portions of said heads, positioning said tubular shaft between said yoke members and bringing said spindle heads closer together by moving at least one spindle head while maintaining the axis thereof in coinciding relation with the axis of the other spindle head until said conical surfaces have been brought into engagement with one another for properly positioning said tubular member relative to said yoke members and welding said members together about said conical engaging surfaces.

3. The method of mounting a universal joint yoke member on the end of a tubular propeller shaft member for a motor vehicle, in substantially complete static and dynamic balance, which method includes the steps of forming said propeller shaft member with an inwardly converging conical end surface, providing a yoke member with a complementary shaped external end surface, supporting said yoke member for rotation on a fixed axis, individually supporting and adjusting the respective ends of said shaft into exact alignment with the yoke axis, said supporting and adjusting being accomplished at the conical end of the shaft by moving at least one of said members toward the other under pressure to cause said conical surfaces to have self-aligning engagement with each other, the supporting of the other end of the shaft being such as to permit the shaft to freely adjust itself under said self-aligning engagement, rotating said shaft and yoke about their common axis, and welding said members together in the region of said conical surfaces during such rotation.

4. The method of permanently mounting a universal joint member on each end of a shaft in substantially complete static and dynamic balance, which method includes the steps of forming said shaft with a conical end surface at each end, forming a complementary conical surface on each of said yoke members, supporting said yoke members with their axes in exact alignment, independently supporting said shaft in a position with its conical end surfaces in partially interengaged relationship with the conical surfaces of the yoke members, and with the axis of the shaft located below the common axis of the yoke members, moving at least one of said yoke members toward the other so as to cause said shaft to be lifted clear of its support by the interengagement of said conical surfaces and to thereby bring its axis into alignment with the common axis of said yokes, and welding said shaft and yokes together in the region of said conical surfaces.

5. The method of permanently mounting a universal joint member on the end of a motor vehicle propeller shaft in substantially complete static and dynamic balance, which method includes the steps of forming said shaft with a conical end surface, providing said yoke with a complementary conical surface for self-aligning engagement with said conical shaft surface, supporting said yoke member on a fixed axis, independently supporting said shaft in a position with its conical end surface in partially interengaged relationship with the conical surface of the yoke member, and with the axis of said conical end surface of the shaft located below the axis of the yoke member, and moving said conical surface into cooperating engagement so as to cause said shaft to be lifted clear of its support as a result of said cooperating engagement and to thereby bring the axis of said shaft into alignment with the axis of said yoke, and subsequently welding said shaft and yoke together in the region of said conical surface.

6. A method of mounting a universal joint yoke member on the end of a motor vehicle propeller shaft in substantially complete static and dynamic balance, including the steps of forming said shaft with a conical end surface, providing said yoke with a complementary conical surface for self-aligning engagement with said conical shaft surface, supporting said yoke on a fixed axis, individually supporting and adjusting the respective ends of said shaft into exact alignment with the yoke axis, said supporting and adjusting being accomplished at the conical end of said shaft by moving the said conical surfaces into cooperating engagement under pressure, and the supporting of the other end of the shaft being such as to permit the shaft to freely adjust itself under the self-aligning action of the conical surfaces, welding said members together in the region of said conical surfaces while maintaining said pressure and alignment, and rotating the yoke and shaft about their common axis during the welding operation so as to produce a uniform ring of welding about the entire circumference of said conical surfaces.

7. A method of mounting a universal joint yoke member on the end of a motor vehicle propeller shaft in substantially complete static and dynamic balance, including the steps of forming said shaft with a conical end surface, providing said yoke with a complementary conical surface for self-aligning engagement with said conical shaft surface, supporting said yoke on a fixed axis, individually supporting and adjusting the respective ends of said shaft into exact alignment with the yoke axis, said supporting and adjusting being accomplished at the conical end of said shaft by moving the said conical surfaces into cooperating engagement under pressure, and the supporting of the other end of the shaft being such as to permit the shaft to freely adjust itself under the self-aligning action of the conical surfaces, welding said members together in the region of said conical surfaces while maintaining said pressure and alignment, and rotating the yoke and shaft about their common axis to facilitate the self-aligning operation.

CARL E. SWENSON.